Jan. 22, 1935. H. H. PLATT Re. 19,438
AIRCRAFT
Original Filed Dec. 30, 1927 6 Sheets-Sheet 1
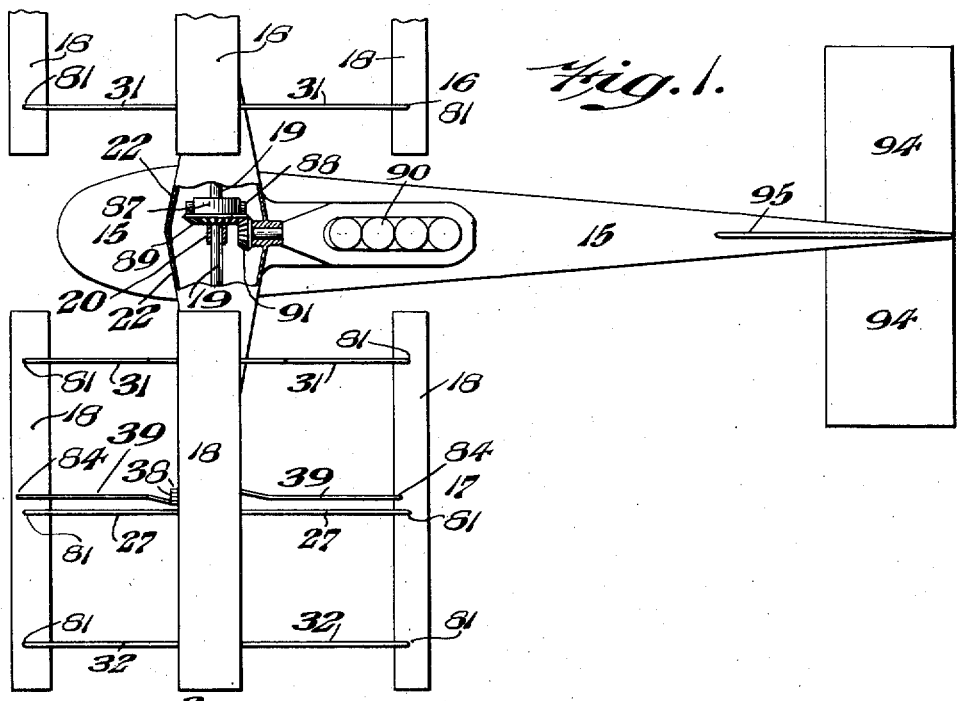
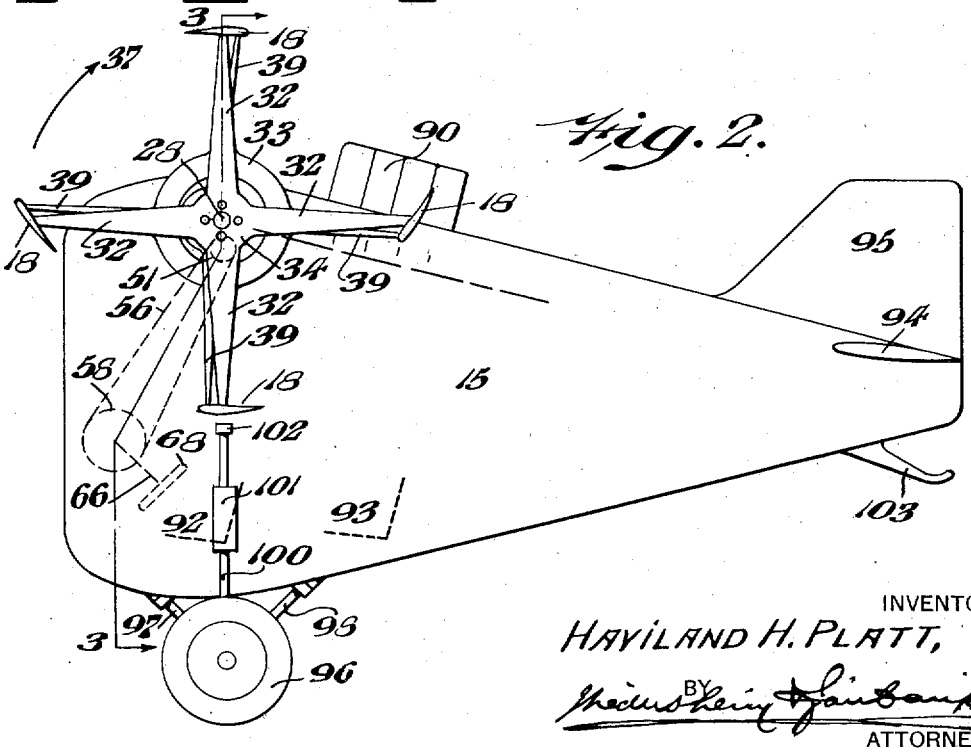
INVENTOR:
HAVILAND H. PLATT,
BY
Shedusheing & Lainbank
ATTORNEYS.

Jan. 22, 1935. H. H. PLATT Re. 19,438

AIRCRAFT

Original Filed Dec. 30, 1927 6 Sheets-Sheet 2

SECTION ON LINE 3-3. FIG. 2.

INVENTOR:
HAVILAND H. PLATT,

BY
Mudsheu & Gaubauks
ATTORNEYS.

Jan. 22, 1935. H. H. PLATT Re. 19,438

AIRCRAFT

Original Filed Dec. 30, 1927 6 Sheets-Sheet 3

SECTION ON LINE 7-7, FIG. 6.

SECTION ON LINE 6-6, FIG. 3.

SECTION ON LINE 5-5, FIG. 4.

INVENTOR:

HAVILAND H. PLATT,

BY Niedersheim & Fairbanks

ATTORNEYS.

Jan. 22, 1935. H. H. PLATT Re. 19,438

AIRCRAFT

Original Filed Dec. 30, 1927 6 Sheets-Sheet 4

INVENTOR:
HAVILAND H. PLATT,
BY
Mudersheim & Laubenstein
ATTORNEYS.

Jan. 22, 1935. H. H. PLATT Re. 19,438

AIRCRAFT

Original Filed Dec. 30, 1927 6 Sheets-Sheet 5

INVENTOR:
HAVILAND H. PLATT,
BY
Wiederhaing & Fairbanks
ATTORNEYS.

Jan. 22, 1935. H. H. PLATT Re. 19,438

AIRCRAFT

Original Filed Dec. 30, 1927 6 Sheets-Sheet 6

INVENTOR:
HAVILAND H. PLATT,
BY
Graves Sherry & Lauritzen
ATTORNEYS.

Reissued Jan. 22, 1935

Re. 19,438

UNITED STATES PATENT OFFICE 19,438

AIRCRAFT

Haviland H. Platt, New York, N. Y., assignor to Frederick W. Wilkening, Philadelphia, Pa.

Original No. 1,795,501, dated March 10, 1931, Serial No. 243,522, December 30, 1927. Application for reissue November 18, 1932, Serial No. 643,154

22 Claims. (Cl. 244—11)

My invention relates to a heavier-than-air type of aircraft and it relates more particularly to an aircraft of this type, which is capable of forms and degrees of navigability unobtainable with the standard types of aircraft heretofore devised.

My invention further relates to a heavier-than-air type of aircraft which, by virtue of universal navigability inherent in the structure thereof, is of greatly increased utility over the present standard forms of aircraft, because it is capable of taking to flight and landing under adverse conditions, of which present standard forms of aircraft are incapable, and because it is also capable of a universal control or navigability in mid-air, which aircraft of the present standard forms are likewise incapable of.

It is well-known that with standard aircraft structures, particularly of the heavier-than-air type, certain limitations are imposed upon the use of the aircraft by the size and character of the landing field with its surrounding obstructions, as well as by the degree of visibility when in flight. Thus, with any of the many present forms of standard aircraft and particularly so with the larger sizes of aircraft when heavily or fully loaded, a relatively large field is required with a uniformly even and firm surface, in order for the aircraft either to take off with safety, or to land with safety.

This requirement as to the size and quality of the landing field is accentuated by the increased size or increased loading of the aircraft, and at best, a field of considerable magnitude is required at present for heavier-than-air aircraft in order for the same to land or take off, which requirement greatly reduces the ultimate utility or practicability of this type of aircraft, aside from the natural hazards attendant upon taking off or landing machines of this type at high speed.

Aside from the limitations of the present standard aircraft in taking off and landing, they are further limited in their ultimate utility by the fact that they require a relatively high air speed in order to maintain them aloft, which inherently increases the hazards of collision with other aircraft or with ground objects or obstructions, particularly so with poor visibility.

By my novel aircraft construction, the above limitations of the heavier-than-air type of machine are eliminated by the following features of navigability inherent in this new construction:

(1) Capacity for vertical as well as horizontal propulsion or propulsion under power, in any direction intermediate the vertical or horizontal. Due to this, the aircraft can take off without a field of any considerable size, and can be maintained aloft without any lateral or horizontal velocity or with any small horizontal velocity.

(2) Ability to change the direction of propulsion or the angle of thrust in any direction while in flight, in a vertical medium plane of the craft.

Hence the craft is not only capable of vertical as well as horizontal propulsion and capable of being maintained stationary in air, but by properly changing and directing the angle of thrust or direction of propulsion the speed of the craft in any direction, particularly in the forward direction, can be decelerated and in fact, the velocity of the machine brought to zero in that direction, in a manner very similar to the braking or stopping of road vehicles.

This latter feature of navigability which can be resorted to in mid-air, automatically decreases the hazard of collision at high speed to substantially the same degree as is now inherent in road vehicles.

In addition to the above features of navigability under power, the craft of this novel construction is also capable of certain other features of navigability, particularly in landing without power. Thus, for instance, it is capable of relatively low vertical speeds in either inclined or vertical descent without power, thus increasing the safe navigability of the craft under emergency conditions.

With the above ends in view my novel invention consists of:

(1) The provision of motor propelled rotatable aerofoils upon the body of the craft which perform the dual primary functions of propulsion and lift, performed in the present standard form of aerofoils by the so-called "propeller" and "wings", respectively.

(2) The provision of a number of such aerofoils disposed horizontally and transversely of the craft, forming collectively a rotor, and supported in such a manner, that the angle of the aerofoil with respect to the aircraft, automatically passes through a predetermined cycle, as the aerofoil passes through its orbit with each revolution of the rotor, in order that each of the number of aerofoils comprising the rotor may be presented the air at their various positions in their orbit, at successively varying angles necessary in order for each aerofoil to perform the function of propulsion and the function of lift, respectively.

(3) The provision of means within the aircraft for varying and controlling, at the will of the operator, the direction of the thrust thus produced by the rotor.

(4) Means for varying and controlling, at the will of the operator, the magnitude of the thrust thus produced.

(5) The provision of a pair of such rotors, one on each side of the machine, and means for either jointly or independently varying and controlling both the direction of propulson or angle of thrust, as well as the magnitude of such propulsion or thrust in each of the two rotors, thereby to attain lateral navigability such as turning, banking and the like.

(6) The invention also consists in so relating the propelling forces and the center of gravity of the fuselage of the aircraft, with respect to the axis of the rotors, that the reaction upon the fuselage, of the driving power transmitted to the rotors, will tend to raise or elevate the rear or tail end of the fuselage to a suitable extent, and so that upon the diminution or cessation of the power delivered to the rotors, the fuselage will tend to "nose-up" to a suitable extent, thereby facilitating the taking-off, as well as the landing of the aircraft.

In the accompanying drawings, I have illustrated in a general way, a form of construction embodying the above structural and functional characteristics, although without any attempt to show any detailed construction.

Thus, Figure 1 represents a top plan view of an aircraft of my novel construction showing the fuselage, partly in section and showing the pair of transversely disposed rotors (one partly broken away).

Figure 2 represents a side elevation of an aircraft of this construction, illustrating further the general relation of the rotor to the fuselage.

Figures 8 to 13 inclusive represent diagrammatic views of illustrating the angles of the several blades or aerofoils of the rotor for the various conditions of flight or navigation, and the respective settings or positions of the manual controls within the fuselage, for obtaining these blade angles.

Figure 8:
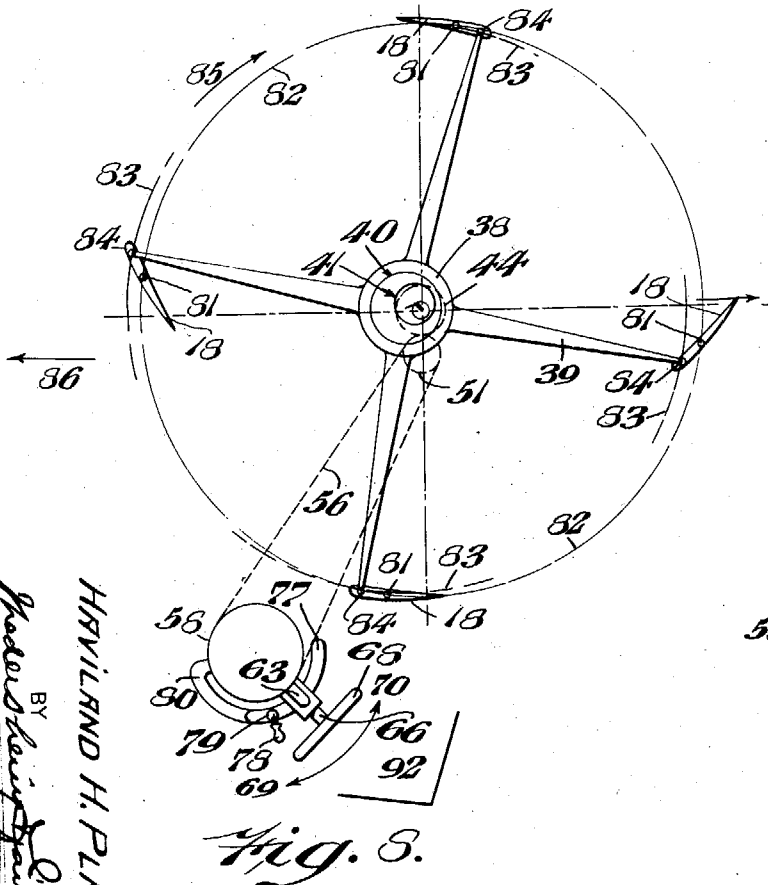

Accordingly, Figure 8 is a diagram of rotor and controls in the straight or full-speed-ahead position, under power.

Figure 9:
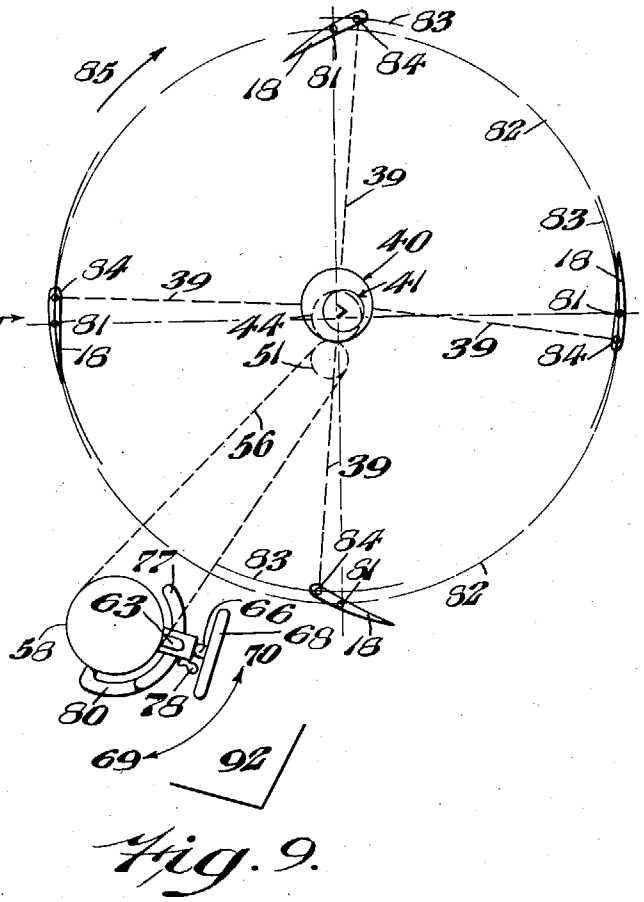

Figure 9 represents a similar diagram of rotor and controls for vertical ascent or descent or hovering, under power.

Figure 10:
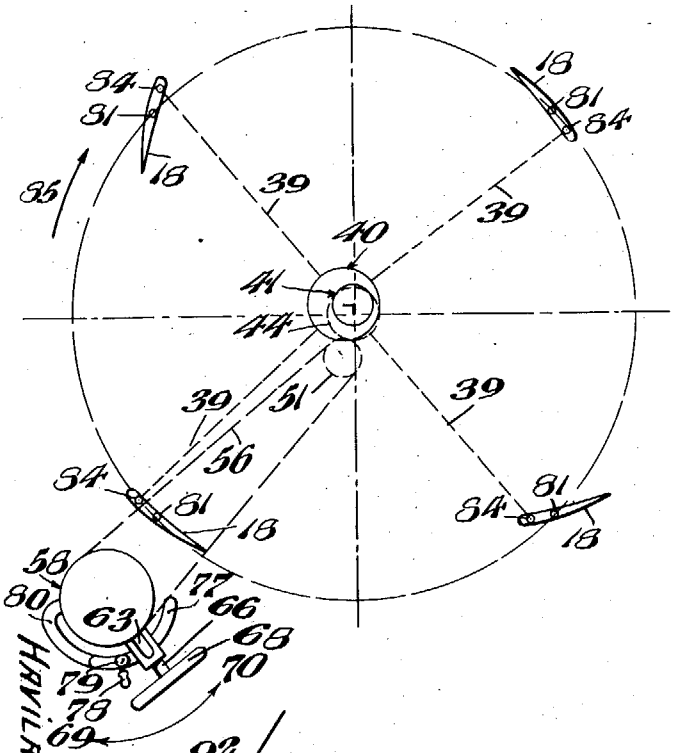

Figure 10 represents a similar diagram of rotor and controls in a position intermediate to that shown in Figures 8 and 9, for an inclined ascent under power.

Figure 11:
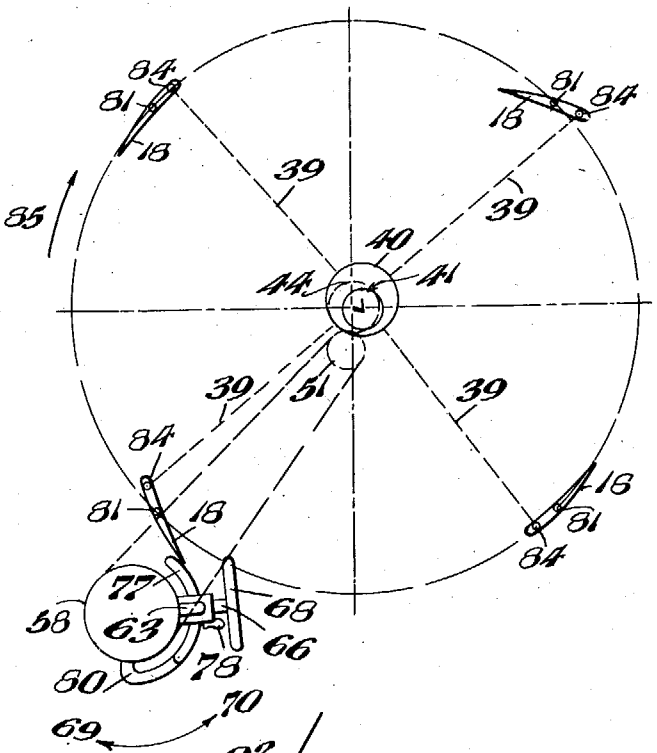

Figure 11 represents a similar diagram of rotor and controls with the direction of propulsion or angle of thrust shifted into a rearward reverse direction or opposed to the direction of travel, for decelerating the machine.

Figure 12:
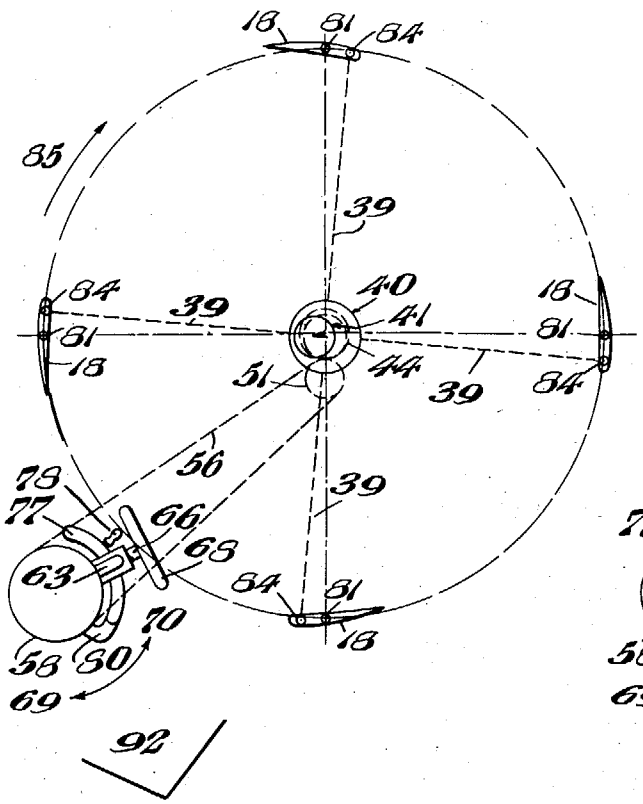

Figure 12 represents a similar diagram of rotor and controls showing the same in a position for vertical descent, without power, and with the rotors free to revolve.

Figure 13:
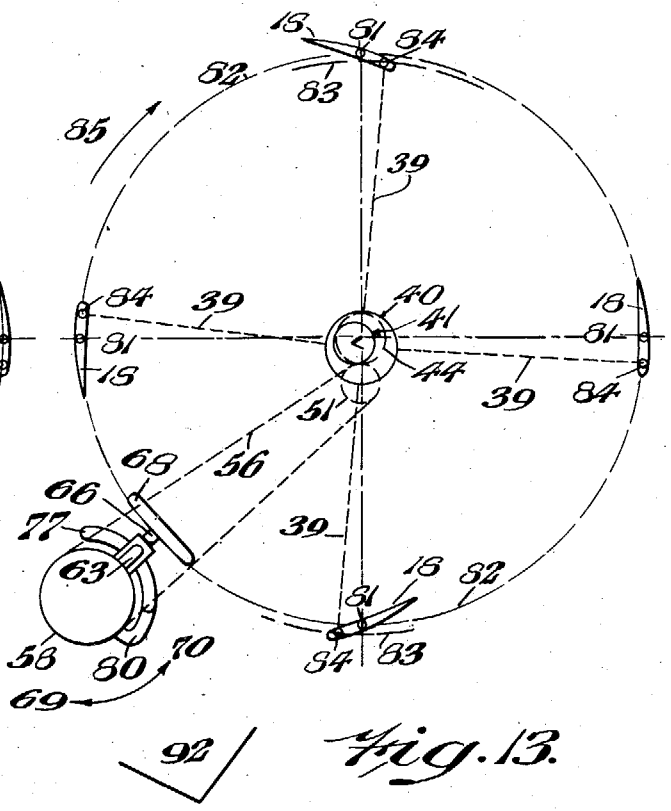

Figure 13 represents a similar diagram of rotor and controls with the angle of thrust directed downwardly for running the engine under load on the ground, for the purpose of warming the engine.

Figure 3:
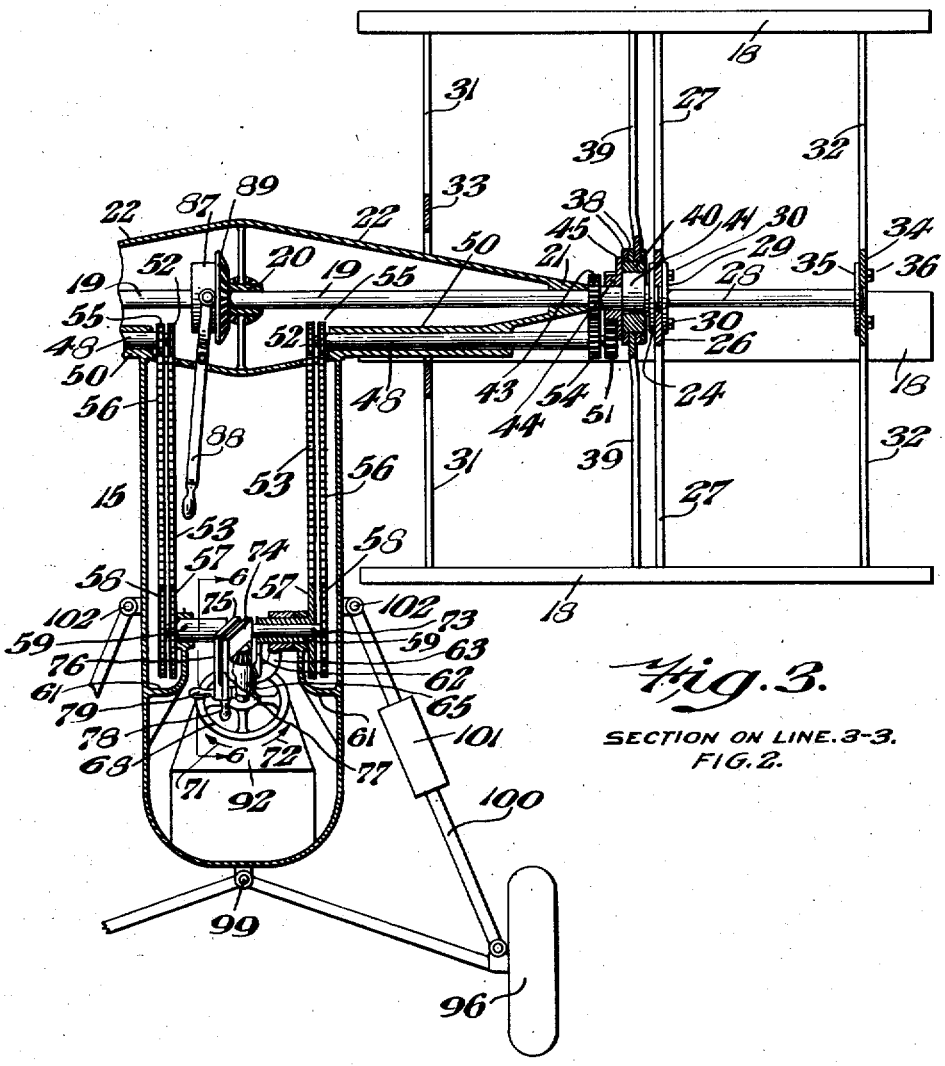
Figure 3 represents a section on line 3—3 of Figure 2 (with one of the rotors not shown) illustrating the method of driving the propeller or rotor and the method of controlling the angle and magnitude of the thrust of the rotor, from within the fuselage.

In Figures 1, 2 and 3 of the accompanying drawings, the fuselage of the air craft of my novel construction is designated generally by the numeral 15. The fuselage may be of any suitable shape and construction, as may be required by the necessary strength, the wind resistance, and gravity forces.

It will be noted that the aircraft of my novel construction lacks the fixed lifting surfaces or what are commonly termed "wings", which invariably form an indispensable part of the conventional aircraft now in use, and it likewise lacks the conventional form of "propeller".

Instead, the aircraft of my novel construction is provided with, what may arbitrarily be termed, "rotors". The rotors, designated generally by numerals 16 and 17, are disposed symmetrically on each side of the fuselage, upon a common horizontal axis extending transversely of the fuselage.

Each rotor comprises a plurality of aerofoils or what may be termed blades 18. The number of blades in a rotor may be varied between some practical limits, depending upon the size of the rotors as well as upon certain other factors. In the illustration of my novel aircraft shown in the accompanying drawings, each rotor contains four blades or aerofoils; that number having been found to give satisfactory results. For some purposes, rotors of three blades as well as possibly five and six blades, may also be desirable.

The two rotors 16 and 17 are supported and driven by a common axial horizontal shaft 19 extending transversely through the fuselage and may be suitably journalled in a central bearing 20 as well as in a pair of opposed terminal bearings 21, carried by and preferably forming part of a driving shaft and gear housing 22, near the top of the fuselage.

The shaft and gear housing 22, being rigid with the fuselage 15, projects outwardly from each side of the fuselage, as seen particularly in Figures 1 and 3, in gradually tapering form, so as to give the driving shaft 19 the necessary rigid support near the point of the load, to wit,—near the outer extremities thereof.

The opposed ends of the main driving shaft 19 extend through the bearings 21, in each end of the laterally projecting shaft and gear housing 22, and also extend through a bearing sleeve 23, which is formed integrally with, or built rigidly with the housing structure 22 and bearings 21.

To each end of the shaft 19, immediately adjacent to the bearing sleeves 23, suitable flanges 24 are fixedly secured. A driving arm spider 25 is provided at the end of the main driving shaft 19, having a hub 26 and a number of similar radial driving arms 27, extending to the number of "blades" comprising the rotor. A shaft extension 28, having a corresponding flange 29 is secured to each of the opposed ends of the main shaft 19 as well as to the corresponding driving arm spider 25, by means of a series of bolts 30 extending through the two flanges 24 and 29, on the main shaft 19 and shaft extensions 28, respectively, and extending also through the hub 26 of the arm spider 25.

Each of the blades 18 is pivotally secured to the corresponding driving arm 27, at a point substantially midway of its length, and with the axis of the pivot being substantially at the center of gravity of the cross-section of the blade, which latter depends upon the particular cross-section of the blade.

The blades 18 may be of any suitable internal construction, although preferably formed of metal. Thus, the blades 18 are preferably thin-walled, metallic shells, hollow within, except for bracing webs of metal to give it the necessary rigidity and strength, and are preferably formed of some of the well-known aluminum alloys. The method of pivoting the blade 18 to the driving arm 27 (as well as other supporting and deflecting arms to be described hereinafter) is not shown in detail in the accompanying drawings, and any suitable pivot construction may be employed for the purpose.

In order to give each blade 18 the necessary resistance to centrifugal forces, while the rotor is in motion, and in order to give the rotors 16 and 17 as a whole, the necessary rigidity, the blades 18 are further supported at or near their opposed ends, by corresponding arms 31 and 32, respectively, to which the blades are similarly pivotally secured at the center of gravity of their cross-sections and in axial alignment with the pivotal support of the main driving arms 27.

Each set of supporting arms 31 is formed integral with, and is carried by a common annular hub or ring 33 which loosely surrounds the corresponding tapering shaft and gear housing 22.

The outer supporting arms 32, on the other hand, are also preferably formed integral with a central hub 34, which is secured to a terminal flange 35 on the outer ends of the shaft extensions 28, by means of bolts 36.

By this means, each blade is supported at its center of gravity against the centrifugal force, as well as against air pressure, at three points along its entire length, while the driving support, through the arms 27, is positioned substantially midway of its length.

As pointed out hereinabove, the rotors, consisting of a plurality of pivotally mounted aerofoils or blades perform two separate and distinct primary functions; one is the propeller function and the other is the wing or lift function. To perform these two functions the rotor or more particularly each blade of the rotor, must be presented to the air stream at various angles as it travels around in a substantially circular path about the axis of the shaft 19.

The arrow 37 in Figures 2 and 8 to 13 inclusive indicate the direction of rotation of the rotor, as well as the path of the blades comprising the same.

In order to vary the angle of each blade at different parts of its travel in the circular path, each blade is connected to a common, normally stationary eccentric, by means of an eccentric strap 38 and a deflecting rod 39, which is rigid and preferably integral with the eccentric strap and the free end of which is pivotally secured to the blade 18 in advance of the supporting pivot, preferably near the leading edge thereof.

By this means, each blade is deflected in succession, between two opposed extreme limiting angular positions, as it passes through each revolution or as it travels through the circular orbit of the blades. The positions in the circle, of the two limiting angles of the blades in their circular orbit, is determined by the direction of the eccentricity of the eccentric, while the magnitude of deflection of the blades, either from their median position or between their two extreme positions, is determined by the amount of the eccentricity.

The direction of the eccentricity therefore determines generally the direction of the forces produced by the action of the blades upon the air stream, while the amount of the eccentricity determines generally the magnitude of the forces so produced.

In order to vary the direction and the amount or magnitude of the eccentricity, and thus to obtain the necessary navigability of the craft, the eccentric straps 38, instead of being merely supported upon a normally stationary eccentric, are instead supported or carried by a dual eccentric, both constituent eccentrics of which are normally stationary but movable with respect to the fuselage as well as with respect to each other, for adjustment or control purposes.

Figure 4:
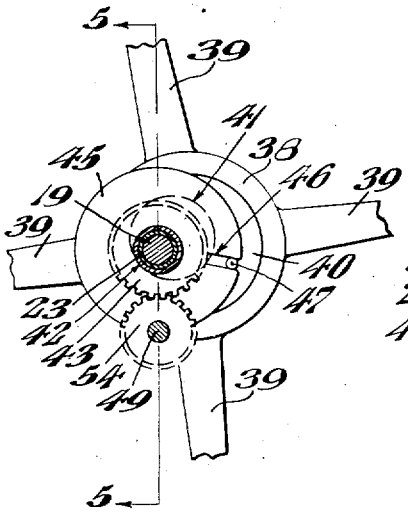
Figure 4 represents a partial side elevation, on an enlarged scale, of the aerofoil or blade deflecting arms of the rotor and the driving and controlling means within the rotor.
Figure 5:
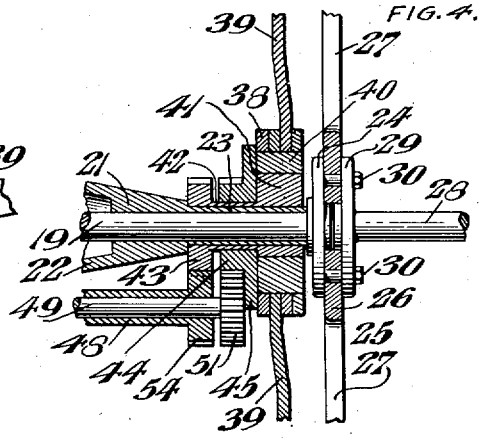
Figure 5 represents a section on line 5—5 of Figure 4, illustrating generally the method of driving or propelling, and the method of actuating the blade deflecting arms and also the manner of varying or controlling the movements of the deflecting arms, thereby to control the angle and magnitude of the resultant thrust of the rotor as a whole.

Thus, upon referring particularly to Figures 3, 4 and 5, it will be noted that the eccentric straps 38 are rotatably mounted upon an outer eccentric 40, which in turn is rotatably mounted upon an inner eccentric 41. The inner eccentric 41 in turn is rotatably mounted upon the concentric bearing sleeve 23 which is rigidly affixed to, or is integral with the shaft and gear housing 22 and terminal main bearing 21.

The inner eccentric 41 is integral with, or is rigidly and fixedly secured to a sleeve 42, to the opposed end of which a pinion 43 is fixedly secured. A pinion 44 is rotatably mounted upon the sleeve 42, and carries a flange 45. The flange 45 is provided with a generally radial slot 46 which engages a laterally extending pin or projection 47 fixed in the outer eccentric 40. By this means, the outer eccentric 40 may be revolved in either direction for adjustment or control purposes, by merely revolving the concentric pinion 44; the motion between the concentric pinion 44 and flange or disc 45 and the eccentric 40 and eccentric pin 47, being effected by the engagement between the slot 46 and the pin 47.

The inner eccentric 41, on the other hand, may be revolved in either direction for adjustment or control purposes, by merely revolving the concentric pinion 43.

In order to maintain the two eccentrics 40 and 41 in any desired relative position with respect to the fuselage and with respect to each other, a pair of concentric control shafts 48 and 49 are provided on each side of the fuselage, corresponding to each of the rotors 16 and 17. The inner control shafts 49 are journalled within the outer tubular control shafts 48, while the latter are journalled in suitable bearings 50 in the fuselage, or more particularly in the main shaft housing 22. Each of the pair of inner control shafts 49 extends beyond the outer tubular control shafts 48 at each end. To the outer ends of each of the inner control shafts 49, pinions 51 are fixedly secured, which are constantly in mesh with the pinions 44 which actuate the outer eccentrics 40. To the inner ends of each of the inner control shafts 49, sprocket wheels 52 are secured, over which the sprocket chains 53 pass.

To the outer ends of each of the tubular control shafts 48, similar pinions 54 are fixedly secured, which are constantly in mesh with the pinions 43, by means of which the inner eccentrics 41 are controlled. The inner ends of each of the outer tubular control shafts in turn carry corresponding sprocket wheels 55, over which the corresponding sprocket chains 56 pass.

The opposed pairs of sprocket chains 53 and 56 extend downwardly to the pilot's or navigator's compartment where they pass around the corresponding sprocket wheels 57 and 58, respectively, forming part of the control mechanism within the pilot's compartment of the fuselage.

Figure 7:
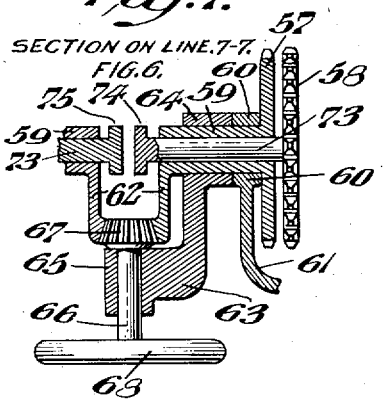
Figure 7 represents a section on line 7—7 of Figure 6.
Figure 6:
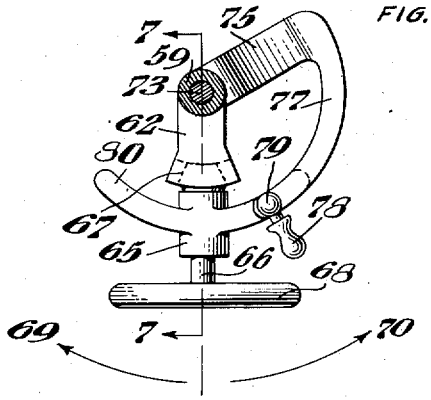
Figure 6 represents a section on line 6—6 of Figure 3, on an enlarged scale, illustrating the means within the fuselage for controlling the angle as well as the magnitude of the thrust of each of the two rotors either jointly or independently of each other.

The pilot's control mechanism is shown in detail particularly in Figures 3, 6 and 7, while the corresponding control mechanisms in the rotors are illustrated in detail particularly in Figures 3, 4 and 5.

Each of the pair of opposed sprocket wheels 57 is carried by a tubular shaft 59 journalled in corresponding and similar bearings 60 which are rigidly carried upon brackets 61 fixed to the fuselage. To the inner and juxtaposed ends of the pair of tubular shafts 59, a corresponding pair of bevelled gears or bevelled gear sectors 62 are fixedly secured in a manner shown particularly in Figure 7. A differential bracket 63 is journalled or rotatably mounted upon one of the tubular shafts 59 by means of the bearing 64 thereof. A lower and right angular bearing 65 of the differential bracket 63 in turn carries the differential or steering shaft 66, to the inner end of which a bevelled pinion 67 is fixedly secured, which in turn is in mesh with each of the two juxtaposed bevelled gear sectors 62, thereby differentially interconnecting the same at all times. The outer end of the shaft 66 carries a steering wheel or other handle member 68.

By deflecting the differential or steering shaft 66, as well as the bracket 63, in either direction 69 or 70, indicated in Figure 6, the outer eccentric 40, of each of the two rotors on either side of the fuselage, will be revolved in either one of two opposed directions, to the same degree or extent. On the other hand, by revolving the wheel or handle member 68 and the shaft 66, in either direction 71 or 72 (indicated in Figure 3) the outer eccentric 40 of each of the two rotors, will be deflected or displaced in opposed directions. Thus, by the deflection of the shaft 66 in either directions 69 and 70 or the rotation of said shaft 66 in either directions 71 or 72, a uniform or a differential adjustment or control of the outer eccentrics 40 in the rotors 16 and 17 is obtainable.

Each of the sprocket wheels 58, on the other hand, is carried by corresponding shafts 73 which extend through the hollow tubular shafts 59 and project beyond the same at each end. To the inner end of the two shafts 73, lever arms 74 and 75 respectively, are secured, which carry arcuate extensions 76 and 77, to which corresponding handles 78 and 79 are secured. The arcuate extensions 76 and 77 are parallel to each other and are arranged frictionally or positively to interlock with each other at will. This friction or positive interlocking means may be any suitable detent, catch or the like, which is not shown in the drawings. An arcuate sector 80 is rigidly carried by the bearing 65 of the bracket 63, and parallel to the arcuate lever extensions 76 and 77. Suitable frictional or positive interlocking means are also provided between either one of the arcuate lever extensions 76 and 77 (or both) and the sector 80, which is stationary with respect to the differential bracket 63, whereby either one or both of the levers 74 and 75 and hence the corresponding pair of shafts 73 may be interlocked with the differential bracket 63 and hence interlocked with the pair of tubular shafts 59, in any desired position intermediate of suitable limits.

By such an interlocking of either one or both of the lever handles 78 and 79 and the levers 74 and 75 with the differential bracket 63, either one or both of the corresponding inner eccentrics 41 in the two rotors respectively, may be revolved or controlled in unison with the outer eccentrics 40.

*The operation*

The operation of the aircraft, or more particularly, the control and navigation thereof can best be understood upon a further reference to Figures 8 to 13 inclusive. In these figures the rotor and controls within the fuselage are represented diagrammatically.

In Figure 8, one of the eccentric straps 38, and the deflecting arm 39 are shown, while in Figures 9 to 13 inclusive the deflecting arms 39 are merely represented by dotted lines. In these figures the inner and outer eccentrics are represented by corresponding circles designated as 41 and 40 respectively. The fixed or driving center of the rotor, that is, the axial center of the driving shaft 19 and bearing sleeve 23, is represented by the intersection of vertical and horizontal reference lines, represented as dot and dash lines. The dotted circle 44 in each of these diagrammatic figures represents the pinions 43 and 44, concentric with the main driving shaft 19 and bearing sleeve 23, while the dotted circle 51 in these figures represents the pinions 51 and 54, by means of which the former pinions are driven for purposes of eccentric control. The dotted line 56 represents the sprocket chains 53 and 56, while the solid circle 58 represents the two sprocket wheels 58 and 57 within the fuselage. The manual control mechanism is also marked by appropriate reference characters, corresponding generally to the detailed view of this mechanism, as shown in Figures 3, 6 and 7.

In each of these diagrammatic figures, moreover, the eccentricity of each of the two eccentrics is represented by corresponding heavy and light lines. Thus the heavy line extending from the fixed center to the center of the eccentric circle 41, represents the eccentricity of the inner eccentric, while the light line extending from the center of the inner eccentric circle 41 to the center of the outer eccentric 40 represents the eccentricity of the outer eccentric.

It will be observed here, that while the supporting centers 81 of the blade 18, which are pivotally secured to the driving arms 27 and bracing or supporting arms 31 and 32, revolve in a true and fixed circle about the fixed center (at the intersection of the two dot and dash reference lines), so too, every other part of the blade 18 likewise revolves about a true circle, though eccentric with the first circle. The center of rotation of each of the various parts of the blade 18 is determined by the resultant or effective or total eccentricity of the inner and outer eccentric. The circle 82 in each of these diagrammatic figures represents the path of travel of the pivotal supporting centers of the blade (which is at approximately the center of gravity of the cross-section of the blade), while the circles 83 represent the path of travel of the deflecting pivot 84 of the blade 18, and hence represent generally the path of travel of the leading edge of said blade.

While the circle 82 is fixed, and has its center at the center of the driving shaft 19, the circle 83 may be varied at will, by means of the eccentric control.

The arrow 85 represents the direction of rotation of the rotor, while the arrow 86 represents the forward direction of the aircraft.

As pointed out heretofore, the magnitude of the force produced by the rotor is determined by the maximum deflection or angularity of the blade angle during each revolution, which in turn is determined by the amount or magnitude of the eccentricity. This is indicated in the diagrammatic views, by the distance between the fixed center (intersection of the two dot and dash reference lines) and the center of the outer eccentric circle 40 (the free end of the light eccentric line).

As also brought out hereinabove, the direction of the force produced by the rotor is determined, on the other hand, by the relative point in the circular path of the blades at which they are deflected to their maximum deflection as determined by the direction or angle of the resultant of effective eccentricity. This latter is indicated in the diagrammatic views by the imaginary line which passes through the fixed center and the center of the outer eccentric circle 40.

Under normal condition, straight flight in any direction, either horizontally, straight away or on an upward ascending incline, or in a vertical rise, is effected by uniform setting of both rotors. The unequal setting of the two rotors is required only under one of three conditions; one is to balance the aircraft when it becomes necessary to do so for any reason whatsoever, that is, when it is necessary to exert unequal forces on the two sides of the aircraft in order to maintain it on an even keel; second, to change the direction of flight or to turn, and to bank the aircraft simultaneously; and third, to effect a displacement of the aircraft sideways.

The navigation of the aircraft under these last three conditions, by an unequal setting of the two rotors, will be discussed hereinafter. Thus the reference to the diagrammatic views of Figures 8 to 13 inclusive, is made primarily with respect to an equal or uniform setting of the two rotors for flight solely in straight lines.

In Figure 8 the rotor and controls are shown in a position for full speed ahead. For full speed ahead, at a uniform altitude, the angle of the effective eccentricity or the direction of thrust of the rotor is inclined upwardly above the horizontal, just sufficiently to maintain the craft at uniform altitude. This depends upon the loading of the craft and upon the forward speed. The angle or maximum deflection of the blade 18 in turn is so adjusted as to present the blade at the most efficient angle of attack with respect to the relative air stream. This magnitude of the eccentricity or of the rotor thrust, depends among others, also upon the loading and upon engine power, as well as upon the speed of the aircraft.

It should be observed here that each blade performs the two distinct functions of "propulsion" and "lift", generally at two different parts of its path of travel in a circle.

Thus, when the blade is at the upper part of the circular orbit it exerts a propelling force, while when the blade is at the lower part of its circular orbit and travels in the same direction as the fuselage, it exerts a lifting force. The lifting force thus produced by the blade is greatly in excess of the lifting force that would ordinarily be produced by a fixed wing of the same projected area because of the fact that the blade when acting as a "lifting wing" in the lower part of its circular orbit, is traveling in the same direction as the fuselage and the speed relative to the fuselage is as great or greater than the air speed of the fuselage, and hence the resultant air speed of the blade in the lower part of its circular orbit is double the speed, or more, of the air speed of the fuselage.

For this reason, the aircraft of this construction can be maintained aloft with aerofoil surfaces of an aggregate projected area less than the fixed area required to lift the same weight at the same speed of the aircraft.

After the inner and outer eccentrics have been set with respect to each other by locking the two levers 74 and 75 to the differential bracket 63, in the desired position, and thereby setting the magnitude of the eccentricity, with the condition of flight as above outlined and indicated in Figure 8, the altitude of the aircraft may be raised or lowered at will, by merely changing the angle of thrust to the desired degree in the desired direction, without however, necessarily changing the magnitude of the thrust or the magnitude of eccentricity.

Thus, while the craft is in straight-away flight full-speed-ahead, the craft can be put into an inclined ascent or descent, primarily by raising or lowering the angle of the resultant or effective eccentricity. This is accomplished merely by deflecting upwardly or downwardly, in either of the directions indicated by the arrows 70 and 69, respectively, (Figure 8 and Figure 6) the differential shaft 66, as well as the differential bracket 63, without, however, turning the wheel 68.

Thus it will be observed that the raising of the shaft 66 in the direction of the arrow 70, will raise the angle of the total or effective eccentricity by revolving the two eccentrics 40 and 41 in the same direction and to the same extent, thereby retaining the magnitude of the resultant eccentricity unchanged. By deflecting the shaft 66 downwardly in the direction of the arrow 69, the reverse takes place. Thus the inner and outer eccentrics 41 and 40 respectively, are both revolved in a counter-direction to the same degree, thereby lowering the angle of eccentricity, without, however, changing the magnitude thereof.

The diagram of Figure 9 represents generally the condition of flight of the craft in a straight vertical ascent. It will be observed that to attain this condition of flight, the direction of the resultant eccentricity or the direction of thrust is made substantially vertical in an upward direction by deflecting the operating shaft 66 in the direction of the arrow 70 to the desired extent.

Since the speed of vertical ascent is necessarily considerably less than the forward speed of the craft, it is necessary, for the best efficiency, to reduce the blade angle or the magnitude of the resultant or effective eccentricity. Thus for vertical ascent, in addition to deflecting the operating or control shaft 66 in an upward direction, as shown in Figure 9, the two operating handles 78 and 79, which control the inner eccentrics 41, must be brought nearer to the shaft 66, thereby to revolve the inner eccentrics to the desired extent with respect to the outer eccentrics. This is also indicated in Figure 9.

The diagram of Figure 10 shows the craft in an upward inclined ascent under power. The rotors and controls for this condition of flight are set in a position intermediate of those shown in Figures 8 and 9, respectively. Thus the direction of the resultant or effective eccentricity or the direction of thrust of the rotor is inclined upwardly at an angle greater than that required to maintain the craft at a uniform altitude. To compensate for the reduction of air speed, due to the upward inclined ascent, the magnitude of the eccentricity and hence the angle of the blade is reduced. Accordingly the control shaft 66 is deflected upwardly to a position intermediate of that shown in Figures 8 and 9, while the inner eccentric control handles 78 and 79 are moved to a position with respect to the control shaft 66 intermediate of the position thereof, shown in Figures 8 and 9, thereby to set the magnitude of the eccentricity to a quantity intermediate of the maximum quantity shown in Figure 8, and the lower quantity shown in Figure 9.

In Figure 11 I have shown the method of control of the aircraft when it is desired to decelerate the speed of the craft, let us say, in a forward direction. This feature of the control of the aircraft is analogous to the "braking" of road vehicles.

This is accomplished by merely changing the angle of the resultant eccentricity or the direction of thrust of the rotor, from a position, for instance, that shown in Figure 8 (full speed ahead) to a position shown in Figure 11, that is, in a somewhat rearward direction or back of vertical. This rearward deflection of the angle of thrust of the rotor must be accompanied, however, by a decrease in the amount of eccentricity or a decrease in the blade angle, which in turn is accomplished by bringing the inner eccentric control handles 78 and 79 nearer to the control shaft 66. The effect of this control is to exert a direct retarding force upon the aircraft, thereby checking its speed. As the speed of the craft is decreased by this operation, the direction of eccentricity or the direction of thrust is again brought forward towards the vertical, so as to maintain the desired altitude of the craft, notwithstanding the reduction in speed, or possibly notwithstanding the bringing of the craft to a standstill.

It will be seen from the foregoing, that the aircraft is navigable under power either in a straight away flight or an upward or a downward inclined ascent or descent, as well as a vertical ascent or descent, at practically any desired horizontal or vertical speed, thereby rendering the craft universally controllable under power and capable of landing and taking off without any limitations as to size or character of landing field.

It should be observed, however, that the aircraft of this novel construction is not limited in navigation to control under power. It is likewise capable of an inclined or a vertical descent without power, as would be occasioned by failure of the engine. Under such emergency conditions the main driving shaft 19, and hence the rotors 16 and 17 are disconnected from the engine or source of driving power, by means of a clutch 87 (shown only conventionally) which may be operated by any suitable handle 88 in proximity to the pilot quarters. The clutch 87 transmits the power from the bevelled gear 89 to the main driving shaft 19 which extends transversely of the aircraft and carriers at its two opposed ends, the two rotors 16 and 17, respectively. The source of power is represented diagrammatically in Figures 1 and 2, as the internal combustion engine 90, suitably connected with the main driving shaft 19, through the bevelled pinion 91.

In order to navigate the craft without power, that is, under emergency condition, with the source of power 90 disconnected from the main driving shaft 19, and with the rotors 16 and 17 therefore free to revolve in unison with each other, a third function of the rotors is utilized. Under this condition of the flight, the rotors are maintained in rotation by the windmill action of the air stream upon the rotors, as the craft passes through the air by the force of gravity.

Thus, for an inclined or gliding descent without power, the blade angle and the direction of thrust or the angle of the resultant eccentricity, is set in substantially the position shown in Figure 8 for full speed flight ahead, under power. For a vertical descent without power, on the other hand, the eccentricity is set substantially as shown in Figure 12. Under each of these two conditions of free flight, as well as any intermediate position, the angle of the resultant eccentricity, or what may be termed the normal direction of thrust of the rotor (under power,) is set substantially in line with the direction of travel of the aircraft, or substantially in line with the air stream. The effect of this is to produce a windmill action upon the rotor, by the air stream, and thereby to maintain the rotor in rotation.

In a free inclined descent the rotors are maintained in rotary motion by the action of the air stream upon the blades, when at a certain part of the path of their travel, while the same blades when at a different part of their circular path of travel, will be presented to the same air stream at an angle so as to produce a reaction opposed to the force of gravity, thereby checking the free downward or vertical component of travel of the aircraft. Here too, the blades in their lower positions act as gliding surfaces.

In a free vertical descent, the blades act as gliding surfaces both in their lower and upper positions, that is, when moving transversely of the direction of travel of the craft.

It will be observed that for an inclined free gliding travel, with the aircraft set substantially in the condition shown in Figure 8, the magnitude of the eccentricity is considerably greater than the magnitude of the eccentricity for a free vertical descent, as shown in Figure 12. It is estimated under either one of these two conditions of the free or gliding flight, either in an inclined or a vertical descent or intermediate angles of descent, the vertical speed of the craft can be kept down to a minimum which will afford a safe landing, while the horizontal speed of the craft can be controlled between any suitable limits and may be reduced to zero, as for instance, in a vertical descent. By this means, therefore, a safe navigability of the craft is obtained even under emergency conditions.

It should also be observed that the fuselage of the aircraft is, in effect, pivotally suspended from the generally horizontal axis of the rotors, and the power delivered from the primary power source, such as the engine or the like, to the rotors, creates a torque reaction upon the fuselage, tending to rotate the fuselage in a direction opposite to the rotation of the rotors, and about the same axis. The center of gravity of the fuselage (the entire structure minus the rotors and rotor shaft) is so located with respect to the axis of the rotors, that if the fuselage were freely suspended from the axis of the rotors, the fuselage would assume a suitably inclined position with its nose-end up, and with its tail-end down. This is the position which the fuselage therefore tends to assume in all "powerless" or free-flight positions, and the landing wheels 96 and the tail-skid 103 are so positioned with respect to each other and with respect to the fuselage that they will be in generally horizontal alignment with each other when the rotors are either auto-rotated by the air passing therethrough (as for instance, in an inclined glide or vertical descent without power or with the engine disconnected) or are merely idling or rotating without substantial power from the engine, that is, when the fuselage is nosed up. As power is applied to the rotors, the torque reaction on the fuselage tends to lift up the tail-end of the fuselage into the position shown in Figure 2, and this torque reaction on the fuselage, of the power delivered to the rotors, is counterbalanced by the weight of the fuselage below the axis of the rotors, as well as by the vertical control which may be derived from the control surfaces 94 while in forward flight.

Thus, the position assumed by the ship in normal forward flight under power would be the general position shown in Figure 2, while if the power were shut off or diminished to "idling" while in flight, the nose would tip up and the tail would be deflected downwardly, because of the elimination of the torque reaction upon the fuselage. This nosed-up position of the fuselage is suitable for gliding and landing, while the horizontal position shown in Figure 2 is suitable for forward flight and for taking off the ground, and is attained through the application of power to the rotors.

In Figure 13, I have illustrated the setting of the rotors and controls when it is desired to warm up the engine in preparation for flight. Thus instead of anchoring the aircraft as is now necessary while warming up the engine, it is merely necessary to deflect the angle of the eccentricity or the direction of thrust in a downward vertical direction, that is, toward the ground. The engine and the rotors may thus be operated indefinitely with the aircraft stationary on the ground.

The foregoing is a general outline of the methods of control, for flights in substantially straight direction.

In order to change the direction of a craft while in flight, that is to turn about, a differential control of the two rotors 16 and 17 is resorted to.

It will be observed that by deflecting the shaft 66 as well as the handle wheel 68 in either direction 69 or 70, without, however, turning the wheel 68, the rotors 16 and 17 are controlled uniformly.

If, however, instead of deflecting the shaft 66 and differential bracket 63, the wheel 68 is revolved in either direction 71 or 72 (Figure 3) then the two hollow tubular control shafts 59, (in the fuselage) and consequently the two control shafts 49 of the rotors, and the corresponding two outer eccentrics 40 will be affected differentially.

Thus, depending upon the direction of rotation of the wheel 68 the angle of the eccentricity of the eccentric 40 in either one of the two rotors 16 and 17 will be deflected upwardly with respect to the angle of eccentricity of the inner eccentric 41, while the same eccentricity in the other rotor will be deflected downwardly to like extent.

By this operation the resultant eccentricity in the two rotors is changed both as to direction and as to magnitude, and hence the thrust of the two rotors 16 and 17 is altered differentially both as to direction and magnitude.

It will be observed moreover, that by differentially varying the positions only of the two outer eccentrics 40, as for instance, in a straight away flight indicated in Figure 8, the resultant eccentricity in one rotor is raised both as to angle and as to magnitude, while in the other rotor the angle of the eccentricity is lowered and the magnitude is decreased correspondingly. The effect of this is not merely a turning of the craft, due to an unequal thrust exerted by the two rotors, but also a simultaneous and automatic banking of the craft due to a raising of the angle of the eccentricity or the direction of thrust on the outside of the turn and a lowering of the same on the inside.

The differential control of the inner eccentrics 41, by a differential setting of the two inner eccentric handles 78 and 79, is utilized primarily for balancing purposes or for stabilizing the aircraft.

In Figures 2, 3 and 8 to 13 inclusive, the pilot's seat is designated generally by the numeral 92, while an auxiliary seat shown also in dotted lines in Figure 2 is designated by the numeral 93.

Since the entire navigation and control of the aircraft is dependent solely upon the uniform or differential control of the two rotors 16 and 17, the aircraft of this novel construction does not require any auxiliary controls, such as ailerons, or vertical or horizontal rudders.

At the tail end of the fuselage 15, a pair of fixed horizontal stabilizers 94 may be provided of suitable area. Likewise, a stationary or rigid vertical stabilizer 95 may also be provided at the tail end of the fuselage. These surfaces 94 and 95, however, are not control surfaces.

The landing gear may be any landing gear of conventional construction such as the pneumatic-tired wheels 96, at the front of the fuselage, carried by suitable landing gear mechanism such as the lower braces 97 and 98 pivotally connected to the fuselage at 99 and the upper brace 100 having suitable shock absorbers 101 intermediate the ends thereof and also suitably pivotally mounted to the fuselage as at 102. A tail skid 103 may likewise be provided at the rear end of the fuselage.

It should be observed that the foregoing construction may be varied without departing from the principles involved in my invention.

Thus, for instance, instead of pivotally supporting the blades 18 upon radial arms 31 and 32, said radial arms may either be replaced or augmented by relatively thin tension wires extending taut between the pivotal points of adjacent blades as cords of a circle or as the sides of a polygon with the pivotal supporting centers of the blades at the apices of the polygon.

While in the drawings I have shown manual control mechanism within the fuselage, connected to the rotor controls by trains of gears of relatively low ratio or mechanical advantage, this construction may be varied to meet practical requirements, as by greatly increasing the ratio or the mechanical advantage between the rotors and the manual controls within the fuselage, so as to reduce to a practical degree the amount of manual force necessary to operate the controls and to maintain them in any set position.

Likewise, if desired, in addition to increasing the ratio of the gear trains, a modified form of mechanism may likewise be employed, by means of which the controls become non-reversible so as to relieve the operator not only of any excessive manual force in operating the controls but of all effort in maintaining the controls in any set position. Thus, by the interposition of suitable worm gears between the rotors and the manual controls in the fuselage, a non-reversible effect may be obtained in the operation of the controls.

In Figures 1 and 2, I have shown the source of power, to wit,—the engine 90, positioned in the uppermost part of the fuselage with its main shaft axis intersecting the axis of the driving shaft 19 of the rotors. In practice it may be desirable to position the engine 90 in the front or in the lowermost part or near the bottom of the fuselage.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new and desire to secure by Letters Patent, is:

1. In an aircraft, a fuselage, a rotor having its axis of rotation extending transversely of the direction of travel, said rotor comprising a pivotally mounted blade, means for oscillating the blade about its pivot between limiting angular positions less than 360 degrees apart, during each revolution of the rotor, means for varying the positions of the outer angular limits of blade oscillations in the orbit of the blade, and means for varying the maximum angle of deflection of the blade in its orbit about the axis of the rotor.

2. In an aircraft, a fuselage, a rotor comprising a plurality of pivotally mounted blades adapted to travel in an orbit about an axis extending transversely of the direction of travel of the aircraft, means for automatically oscillating about its pivot each of the blades in succession during each revolution of the rotor, between two predetermined limiting angles, means for positioning the two limits of angular blade oscillation at any desired part of the orbit of the blades at the will of the operator, and means for varying the angle between the two limits of blade oscillation, also at the will of the operator.

3. In an aircraft, a fuselage, a rotor comprising a plurality of aerofoil blades rotatably mounted about an axis extending transversely of the direction of travel of the aircraft, a normally stationary composite eccentric for automatically deflecting each of the blades between two generally opposed limits of angular deflection, during each revolution of the rotor, and means for varying the direction as well as the magnitude of the effective eccentricity of the composite eccentric at the will of the operator, thereby to vary both the positions of the two limits of angular blade deflection in the orbit of the blades and also to vary the angle between such two opposed limits of blade deflection.

4. In an aircraft, a fuselage, a rotor comprising a plurality of aerofoils arranged to rotate about an axis extending transversely of the normal direction of travel of the aircraft, a composite eccentric comprising a plurality of dependent eccentrics, means for independently varying the direction or angle of the eccentricity of each of the plurality of dependent eccentrics at the will of the operator, thereby to vary both the direction and magnitude of the resultant effective eccentricity of the composite eccentric, and thereby to vary the position of the two opposed limits of blade deflection in the orbit of the blades, and also to vary the angle between such limits of blade deflection.

5. In an aircraft, a fuselage, a rotor comprising a plurality of aerofoil blades adapted to revolve generally about an axis extending transversely of the normal direction of travel of the aircraft, a normally stationary, composite eccentric, means intermediate said composite eccentric and each of said blades for angularly oscillating each of said blades between two opposed and predetermined limiting positions during each revolution of the rotor, said composite eccentric comprising a plurality of normally stationary and adjustable, dependent eccentrics, and means for independently varying the direction of the eccentricity of each of said dependent eccentrics at the will of the operator, thereby to vary both the direction as well as the magnitude of the resultant effective eccentricity of the composite eccentric, at the will of the operator.

6. In an aircraft, a fuselage, a pair of opposed rotors, each including a plurality of aerofoil blades adapted to revolve generally about an axis extending transversely of the direction of travel of the aircraft, automatic means for angularly oscillating each of the blades of the rotors between two opposed limits during each revolution of said rotors, means for varying the positions of the two opposed limits of angular blade deflection in the orbit of the blades at the will of the operator, and means for varying the angle between the two limits of angular blade deflection at the will of the operator.

7. In an aircraft, a fuselage, a pair of opposed rotors, each including a plurality of aerofoil blades adapted to revolve generally about an axis extending transversely of the normal direction of travel of the aircraft, automatic means for angularly oscillating each of the blades of the rotors between two opposed limits during each revolution of said rotors, means for varying the positions of the two opposed limits of angular blade deflection in the orbit of the blades at the will of the operator, means for varying the angle between the two limits of angular blade deflection at the will of the operator, and means for effecting said variations in the two opposed rotors of the aircraft, either uniformly or differentially, also at the will of the operator.

8. In an aircraft, a fuselage, a pair of opposed rotors, each comprising a plurality of aerofoil blades adapted to revolve generally about an axis extending transversely of the normal direction of the travel of the aircraft, a normally stationary, composite eccentric in each of said rotors, means intermediate the composite eccentric and each of the blades of the rotors for automatically oscillating each of the blades between two opposed limits of angular blade deflection during each revolution of the rotors, each of said composite eccentrics comprising a plurality of dependent eccentrics, and means for varying the direction of eccentricity of each of said dependent eccentrics comprising each of the composite eccentrics, either jointly or independently of each other at the will of the operator, thereby to vary either the direction or the magnitude of the resultant effective eccentricity of the composite eccentrics or to vary both the direction and the magnitude of the effective eccentricity of said composite eccentrics.

9. In an aircraft, a fuselage, a pair of opposed rotors, each comprising a plurality of aerofoil blades adapted to revolve generally about an axis extending transversely of the normal direction of the travel of the aircraft, a normally stationary, composite eccentric in each of said rotors, means intermediate the composite eccentric and each of the blades of the rotors for automatically oscillating each of the blades between two opposed limits of angular blade deflection during each revolution of the rotors, each of said composite eccentrics comprising a plurality of dependent eccentrics, means for varying the direction of eccentricity of each of said dependent eccentrics comprising each of the composite eccentrics, either jointly or independently of each other at the will of the operator, thereby to vary either the direction or the magnitude of the resultant effective eccentricity of the composite eccentrics or to vary both the direction and the magnitude of the effective eccentricity of said composite eccentrics, and means for effecting such joint or independent variations of directions of eccentricities in each of the pair of opposed rotors, either uniformly or differentially, at the will of the operator.

10. In an aircraft, a fuselage, a rotor comprising a plurality of pivotally mounted aerofoil blades adapted to travel generally about a common axis and extending transversely of the normal direction of travel of the aircraft, a source of power for revolving said rotor, means for oscillating each of said blades in succession during each revolution of said rotor, manually operable means for varying said oscillations, and means intermediate said source of power and said rotor for operatively connecting or disengaging the two, at the will of the operator.

11. In an aircraft, a fuselage, a driving shaft, a rotor carried by said driving shaft comprising a plurality of blades, means intermediate said driving shaft and each of said blades, rigidly secured to the former and having pivotal supporting connection with the latter, a stationary supporting frame, an eccentric carried by said stationary frame member, means intermediate said eccentric and each of said blades, having pivotal connection with the latter, manual controls within the fuselage, and means intermediate said manual controls and said eccentric for varying the direction and the magnitude of the eccentricity thereof, at the will of the operator.

12. In an aircraft, a fuselage, a driving shaft, a rotor carried by said driving shaft comprising a plurality of blades, means intermediate said driving shaft and each of said blades, rigidly secured to the former and having pivotal supporting connection with the latter at substantially the center of gravity of the cross section thereof, a stationary supporting frame, an eccentric carried by said stationary frame member, means intermediate said eccentric and each of said blades, having pivotal connection with the latter, manual controls within the fuselage and means intermediate said manual controls and said eccentric for varying the direction and the magnitude of the eccentricity thereof, at the will of the operator.

13. In an aircraft, a fuselage, a driving shaft, a rotor carried by said driving shaft comprising a plurality of blades, means intermediate said driving shaft and each of said blades, rigidly secured to the former and having pivotal supporting connection with the latter, a stationary supporting frame, an eccentric carried by said stationary frame member, means intermediate said eccentric and each of said blades, having pivotal connection with the latter, in advance of the pivotal supporting connection thereof, manual controls within the fuselage, and means intermediate said manual controls and said eccentric for varying the direction and the magnitude of the eccentricity thereof, at the will of the operator.

14. In an aircraft, a fuselage, a driving shaft, a rotor carried by said driving shaft comprising a plurality of blades, means intermediate said driving shaft and each of said blades, rigidly secured to the former and having pivotal supporting connection with the latter, at substantially the center of gravity of the cross section thereof, a stationary supporting frame, an eccentric carried by said stationary frame member, means intermediate said eccentric and each of said blades, having pivotal connection with the latter, in advance of the pivotal supporting connection thereof, manual controls within the fuselage and means intermediate said manual controls and said eccentric for varying the direction and the magnitude of the eccentricity thereof, at the will of the operator.

15. In an aircraft, a fuselage, a driving shaft, a rotor carried by said driving shaft comprising a plurality of blades, means intermediate said driving shaft and each of said blades, rigidly secured to the former and having pivotal supporting connection with the latter, a stationary supporting frame, a normally stationary eccentric carried by said stationary frame member, a second normally stationary eccentric carried by said first eccentric, means intermediate said second eccentric and each of said blades, having pivotal connection with the latter, and means for independently rotating each of said eccentrics.

16. In an aircraft, a fuselage, a driving shaft, a driving spider rigidly attached to said driving shaft, a plurality of blades pivotally mounted on said driving spider, a stationary supporting frame, a normally stationary eccentric carried by said supporting frame, a second normally stationary eccentric carried by said first eccentric, a connecting rod intermediate said second eccentric and each of said blades, and means for independently rotating each of said eccentrics.

17. An aircraft, comprising a fuselage, a rotor, comprising a plurality of pivotally mounted aerofoil blades, extending generally transversely to the direction of travel of the aircraft and adapted to revolve in an orbit about the axis of the rotor, means for automatically oscillating each of said aerofoil blades in succession about its respective pivot during each revolution of the rotor, and means for varying the magnitude of the oscillation and the event of the oscillation in the travel of the aerofoil blades about the axis of the rotor, at the will of the operator.

18. An aircraft comprising a fuselage, a rotor comprising a plurality of pivotally mounted aerofoil blades extending generally transversely to the direction of travel of the aircraft and adapted to revolve in an orbit about the axis of the rotor, a composite eccentric for oscillating each of said aerofoil blades in succession about its respective pivot, during each revolution of the rotor and for varying the magnitude and the event of said oscillations, and manual control means for operating said composite eccentric to effect said variation of magnitude and event of the oscillations.

19. An aircraft comprising a fuselage, a rotor comprising a shaft and a plurality of pivotally mounted aerofoil blades carried by said shaft and being spaced therefrom generally equidistantly, and having cambered transverse cross-sections, said shaft and blades extending generally transversely of the normal direction of travel of the aircraft and said shaft being disposed generally above the center of gravity of the fuselage; means for automatically oscillating, between two predetermined limiting angles, each of said blades, in succession, about its respective pivots, during each traverse through the orbit of said blades, means for varying the limits of oscillation of said blades with relation to each other and with relation to the orbit of said blades, and a prime mover operatively connected to said rotor, rotatably to propel the same in a direction such that when the rotor is power-driven, the torque reaction of the rotor upon the fuselage will tend to raise the rear end of the fuselage.

20. In an aircraft, a fuselage, a rotor having its axis of rotation extending transversely of the direction of travel, said rotor comprising a pivotally mounted aerofoil blade having a cambered transverse cross-section, means for oscillating the blade about its pivot between limiting angular positions less than 360 degrees apart, during each revolution of the rotor, means for varying the positions of the outer angular limits of blade oscillations in the orbit of the blade, and means for varying the maximum angle of deflection of the blade in its orbit about the axis of the rotor.

21. In an aircraft, a fuselage, a rotor comprising a plurality of pivotally mounted aerofoil blades having cambered transverse cross-sections, adapted to travel in an orbit about an axis extending transversely of the direction of travel of the aircraft, means for automatically oscillating about its pivot each of the blades in succession during each revolution of the rotor, between two predetermined limiting angles, means for positioning the two limits of angular blade oscillations at any desired part of the orbit of the blades at the will of the operator, and means for varying the angle between the two limits of blade oscillation, also at the will of the operator.

22. In an aircraft, a fuselage, a rotor comprising a plurality of aerofoil blades having cambered transverse cross-sections, rotatably mounted about an axis extending transversely of the direction of travel of the aircraft, a normally stationary composite eccentric for automatically deflecting each of the blades between two generally opposed limits of angular deflection, during each revolution of the rotor, and means for varying the direction as well as the magnitude of the effective eccentricity of the composite eccentric at the will of the operator, thereby to vary both the positions of the two limits of angular blade deflection in the orbit of the blades and also to vary the angle between such two opposed limits of blade deflection.

HAVILAND H. PLATT.